United States Patent
Ayers et al.

[15] 3,662,555
[45] May 16, 1972

[54] METHOD FOR OPERATING A HYBRID ROCKET ENGINE

[72] Inventors: Orval E. Ayers; Niles C. White, both of Huntsville, Ala.

[73] Assignee: The United States of America as represented by the Secretary of the Army

[22] Filed: Dec. 11, 1963

[21] Appl. No.: 329,928

[52] U.S. Cl. ................................................60/220, 60/219
[51] Int. Cl. .............................................................C06d 5/10
[58] Field of Search ..................60/35.4, 219, 220; 149/2, 19

[56] References Cited

UNITED STATES PATENTS

| 3,068,641 | 12/1962 | Fox | 149/19 |
| 3,083,526 | 4/1963 | Hudson | 60/35.4 |
| 3,017,748 | 1/1962 | Burnside | 149/37 |
| 1,506,323 | 8/1924 | O'Neill | 149/37 |

OTHER PUBLICATIONS

Zaehnnger, " Solid Propellant Rockets–Second Stage," American Rachet Co., Box 1112, Wyandotte, Mich. (1958) pp. 229

Kit et al., " Rocket propellant Handbook," MacMillan Co., N.J. 1960 p. 128

Primary Examiner—Benjamin R. Padgett
Attorney—Harry M. Saragovitz, Edward J. Kelly and Herbert Berl

EXEMPLARY CLAIM

In the method of operating hybrid-propellant rocket engines wherein a fluid oxidizer is introduced into the combustion chamber of said engine to support the combustion of a solid fuel disposed in said chamber thereby generating thrust, the improvement which comprises first introducing into said chamber as a first oxidizer a member selected from the group consisting of hydrogen peroxide and water-hydrogen peroxide mixtures rich in hydrogen peroxide to support combustion upon ignition and thereafter introducing water to support continued combustion of said solid fuel while ceasing the introduction of said first oxidizer.

10 Claims, No Drawings

METHOD FOR OPERATING A HYBRID ROCKET ENGINE

The invention described herein may be manufactured and used by or for the Government for governmental purpose without the payment of any royalty thereon.

This invention relates generally to a method of operating a rocket engine. Particularly, this invention relates to an improved method of operating a hybrid-propellant rocket engine.

Most rocket engines now in use utilize either a solid or liquid propellant. However, at the present time, there is an interest in what is commonly referred to as the "hybrid" or "hybrid-propellant" rocket engine. In the hybrid-propellant rocket engine, the fuel is a solid grain rigidly positioned in the combustion chamber while the fluid oxidizer, usually a liquid, necessary to sustain combustion is introduced into the chamber during combustion. Thus, the hybrid-propellant rocket engine combines characteristics of both the solid and liquid fueled engines.

One particular advantage of the hybrid-propellant engine is that by controlling the rate of flow of the fluid oxidizer into the combustion chamber, the thrust of the engine can be regulated. Normally, in the standard solid propellant engine, the oxidizer and fuel are bound together as a single grain and once combustion is initiated, there is no practical means for altering the thrust except by regulating the size of the nozzle, a difficult task at best. However, altering the flow of a fluid oxidizer is a relatively simple task and it is currently done in almost every liquid fuel rocket engine.

The present invention concerns an improved method for operating hybrid-propellant engines generally and also to particular combinations of fuel and oxidizers to be used in the operation of a hybrid-propellant engine. In general, the improved method of operating a hybrid engine according to the present invention involves the use of water, hydrogen peroxide, or water hydrogen peroxide solutions as oxidizers for a solid fuel grain. The grain preferably consists essentially of a cured, intimate mixture of powdered aluminum or powdered aluminum hydride and any of the conventional organic binders utilized in preparing cast or extruded solid propellant grains. Since water can be used as an oxidizer in the improved method of operation, the invention will find wide use in military applications since there will be no need to transport or store highly corrosive, unstable, or otherwise dangerous oxidizers. Water can be obtained anywhere troops are located. Moreover, the solid fuel grains contemplated for use in the present method of operating hybrid engines are also relatively economical and stable. The method, therefore, is particularly attractive for utilization in rockets where economy is a prime consideration such as military rockets, rockets used in obtaining meteorological data, rockets used in securing scientific data in the upper atmosphere, and the like.

In accordance with the foregoing, it is an object of the present invention to provide an improved method for operating hybrid-propellant rocket engines.

Another object of the invention is to provide an improved method for operating hybrid-propellent rocket engines, the method using economical and stable propellants of high performance.

A further object of this invention is to provide an improved method of operating hybrid-propellant rocket engines using water as an oxidizer.

A still further object of the instant invention is to provide an improved method of operating hybrid-propellant rocket engines using hydrogen peroxide-water solutions or hydrogen peroxide alone as an oxidizer.

The manner in which these and other objects can be accomplished will become apparent from the following detailed description.

The solid fuel grain to be used in the method of the present invention can use any of the organic binders known in the art to be satisfactory binders for solid propellants. Among the conventional organic binders suitable for use with the present invention are the polysulfides; the polyurethanes; the polyesters; the amide epoxide polymers; the polymers of the dienes such as 1,3-butadiene, isoprene, chloroprene,2,3-dimethyl-1, 3-butadiene, 1,3-pentadiene copolymers of the dienes with each other; the polymers of acrylic acid, methacrylic acid, methyl methacrylate, ethyl acrylate, beta-acryloxypropionic acid, acrylonitrile, methacrylonitrile; polymers of the unsaturated difluoroamino compounds such as 2,3-bis(difluoroamino)propyl acrylate; and copolymers of any of the above and other unsaturated compounds with each other.

A preferred class of binders are the polymers of the hydrocarbon conjugated dienes and their halogen substituted analogs containing from four to six carbon atoms per molecule such as 1,3-butadiene, isoprene, chloroprene, 1,3-pentadiene, and 2,3-dimethyl-1, 3-butadiene; copolymers of these conjugated dienes with each other; copolymers of these conjugated dienes with 2,3-bis(difluoroamino)propyl acrylate or other unsaturated difluoroamino substituted compounds of not more than six carbon atoms; polymers of the unsaturated aliphatic hydrocarbon carboxylic acids of up to eight carbon atoms or their lower alkyl esters, such as acrylic acid, methacrylic acid, vinyl acrylic acid, 2-ethel-3 propylacrylic acid, and the methyl and ethyl esters of these acids; copolymers of these unsaturated carboxylic acids or their esters with each other; copolymers of the unsaturated carboxylic acids or their esters with 2,3-bis(difluoroamino)propyl acrylate and other unsaturated difluoroamino compounds of not more than six carbon atoms; and finally, copolymers of these unsaturated carboxylic acids or their esters with the conjugated dienes of not more than six carbon atoms. The two especially preferred binders are poly 2,3-bis(difluoroamino)propyl acrylate and the copolymers of butadiene and acrylic acid.

Aluminum, aluminum hydride lithium powders, lithium hydride, and the like serve as a high energy fuel additive in the solid fuel grain. Generally, aluminum is the preferred additive. Of course, the binder itself also serves as a fuel and the incorporation of a high energy metallic fuel is not mandatory.

In the actual solid fuel grain of the invention, the organic binder generally constitutes from about 10 percent by weight to about 95 percent be weight of the fuel grain with aluminum or aluminum hydride powder and the like being about 5 percent be weight to about 90 percent by weight of the grain. A preferred class of fuel grains consists essentially of a cured intimate mixture of about 20 percent by weight to about 80 percent by weight of the copolymer of butadiene and acrylic acid and from about 20 percent by weight to about 80 percent by weight powdered aluminum or aluminum hydride. The aluminum hydride or aluminum can vary in particle size of about 325 mesh to about 20 mesh. With water as an oxidizer and a fuel grain of about 20 percent by weight polybutadiene copolymer and about 80 percent by weight aluminum. A specific impulse of greater than 250 seconds is possible.

The solid grains are prepared according to standard techniques well known in the art (See U.S. Pat. Nos. 2,994,790; 3,002,830; 3,036,939). The powdered aluminum or aluminum hydride is thoroughly mixed with the liquid prepolymer to achieve uniform distribution of the powder throughout the mixture. Suitable curing agents are then added to the mixture with continued stirring. The mixture is subsequently poured into a suitable mold or even in the motor case itself and allowed to cure thus forming a solid, cured, intimate mixture of the polymer and the powdered aluminum or aluminum hydride. It is to be understood that the percentages by weight given for the polymer in the solid grain is intended to include conventional curing agents, accelerators and catalyst which are added to the prepolymer to cause it to cure to a solid. The fuel is referred to as a grain since the solid fuel is ordinarily cast as a single unit.

In the operation of a hybrid-propellant rocket engine according to the present invention, the solid fuel grain is rigidly positioned in the combustion chamber and the oxidizer is injected into the chamber through conventional type injectors.

The grain will generally adhere to the wall of the chamber if cured in the chamber or the chamber can be lined with a material which will adhere to it and the propellant then cured in the lined chamber. The injector atomizes and/or vaporizes the liquid oxidizer to facilitate the combustion process. Ignition is achieved according to routine techniques such as with a slug-hypergol start where spontaneous ignition is achieved by simultaneously injecting an amine and red fuming nitric acid into the chamber. Suitable amines include aniline and methyl amine. Once the grain begins to burn, the acid and amine flow is ceased and the water or hydrogen peroxide flow is initiated. Another suitable means of ignition is the ignition of a butane-air mixture in the chamber to start combustion of the grain. Various squib igniters can also be used to initiate combustion, especially those using ammonium perchlorate as an oxidizer and magnesium and/or aluminum as a fuel. If a small amount of calcium permanganate is coated on the grain, spontaneous ignition can be achieved with hydrogen peroxide. Moreover, hydrogen peroxide can always be first injected into the chamber as the oxidizer until combustion is started and then water can take over as the oxidizer and the flow of hydrogen peroxide stopped. This is advantageous since hydrogen peroxide has more available oxygen to support combustion in the early stages of burning.

Water used an an oxidizer according to the present invention should preferably be distilled or at least demineralized. Nevertheless, ordinary tap water performs satisfactorily. Aqueous hydrogen peroxide solutions of 98 to 99 percent hydrogen peroxide are desireable when hydrogen peroxide is being used as an oxidizer in the ignition stage of rocket engine operation since these solutions obviously have more available oxygen to support combustion. However, upon ignition weaker aqueous solutions of 0 to 99 percent hydrogen peroxide can be used as should be apparent since water itself is a satisfactory oxidizer. Hydrogen peroxide is unstable and thus water is the preferred oxidizer from the standpoint of handling and storage.

An especially preferred aspect of the present invention is the method of operating a hybrid-propellant rocket engine utilizing a solid fuel grain consisting essentially of a cured intimate mixture of from 20 to 80 percent by weight of the copolymer of butadiene and acrylic acid and from 20 to 80 percent by weight of aluminum powder and, as an oxidizer, water. This particular combination offers one of the most economical fuel-oxidizer combination now available in any type rocket engine. Moreover, the components of the fuel are extremely stable making them very desireable for military application. Furthermore, these combinations can easily produce equilibrium specific impulses of 230 seconds to 250 seconds.

EXAMPLE 1

About 1.9 parts of the diglycidyl ether of glycol and 5.6 parts of the reaction product of epichlorohydrin and bisphenol-A were mixed with 42.5 parts of a liquid butadiene-acrylic acid copolymer in a sigma blade mixer. To this mixture was slowly added with continued stirring about 200 parts of aluminum powder. The temperature was increased from room temperature to about 38° to 40° C. and mixing was continued for another 20 minutes. The mixture was then transferred to a motor casing through a deaeration hopper. The motor casing was placed in an oven and the fuel grain was allowed to cure for 72 hours at 75° to 80° C. (as used herein, parts refer to parts by weight.)

EXAMPLE 2

The same procedure as set forth in Example I was followed except that a liquid copolymer of 2,3-bis(difluoroamino)propyl acrylate and methacrylic acid is substituted for the butadiene-acrylic acid copolymer.

The difluoroamino compounds contemplated by the present invention are prepared by the addition reaction of tetrafluorohydrazine to an ethylenically unsaturated compound according to the general reaction:

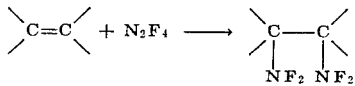

The reaction temperature can vary from about 40° C. to about 150° C. with subatmospheric pressures to super-atmospheric pressures, generally in the range of one-eighth atmosphere to about 5 atmospheres. A stoichiometric excess of tetrafluorohydrazine is desirable. The following example illustrates the process.

EXAMPLE 3

Preparation of 1,2-bis(difluoroamino)-ethane

There was introduced into a 500cc. evacuated Pyrex bulb equipped with a stopcock and condensing arms $8.7 \times 10^{-3}$ mole of crude tetrafluorohydrazine (75% $N_2F_4$; remainder being $NF_3$, $N_2O$, and NO) and $6.7 \times 10^{-3}$ mole ethylene. The bulb was then attached to a capillary monometer and heated for 15 hours at a temperature of 110° to 120° C. in an oil bath.

The bulb was removed from the oil bath and the condensing arm immersed in a bath at −196° C. A pressure of about 3 mm. (mercury) of noncondensable material was pumped from the bulb. The material remaining in the bulb was warmed to room temperature and transferred into the vacuum system. A small quantity of non-volatile material remained in the bulb. The material in the vacuum system was fractionated through traps maintained at −78° C., −110° C., −160° C. The fractions collected at −110° C. were combined and refractionated for 3 hours through traps maintained at −46° C., −66° C., −96° C., and −196° C. The 1,2-bis(difluoroamino)ethane collected in the −96°C. fraction as a colorless liquid with a vapor pressure of 32 mm. (mercury) at 0° C. The yield was 55 percent based on the tetrafluorohydrazine consumed.

EXAMPLE 4

Preparation of 2,3-bis(difluoroamino)propyl alcohol

The same procedure as outlined in Example 3 is followed except that allyl alcohol is substituted for the ethylene thereby producing 2,3-bis(difluoroamino)propyl alcohol. By reacting 2,3-bis(difluoroamino)propyl alcohol with acrylyl chloride according to the standard techniques for preparing esters of alkenoic acids, 2,3-bis(difluoroamino)propyl acrylate can be synthesized.

As previously mentioned, one of the advantages of the hybrid-fueled rocket engines is the regulation of thrust by controlling the flow of oxidizer to the combustion chamber. Therefore, the quantity of water or hydrogen peroxide which is to be injected into the combustion chamber can vary considerably. However, the amount of oxidizer will generally vary from 0.8 times to 1.2 times the stoichiometric amount, the stoichiometric amount being that quantity of oxidizer necessary to furnish sufficient oxygen to convert all carbon atoms in the fuel to carbon monoxide, and all aluminum to aluminum oxide, $Al_2O_3$. Since some of the binders themselves contain oxygen, the solid fuel grain itself can furnish some oxidizer. However, for purposes of defining the amount of water or hydrogen peroxide to be injected into the combustion chamber, the oxidizers available in the fuel grain can be disregarded and all the oxidizers can be considered as coming from the water and hydrogen peroxide. Since it is well known in the art that a given fuel in a particular engine may require somewhat more or less oxidizer than this stoichiometric amount to give the desired optimum performance, the optimum amount of oxidizer for operating hybrid-fueled motors according to the present invention will vary. However, tests have shown that the indicated range of 0.8 to 1.2 times the stoichiometric amount gives operable limits within which optimum conditions can be ascertained. The solid propellant composition of Example 1 gives a specific impulse of slightly more than 250 seconds when water is injected as the oxidizer in the stoichiometric amount. Using the same binder and substituting aluminum hydride powder for aluminum, the corresponding composition gives a specific impulse of slightly more than 300 seconds with the stoichiometric quantity of 98 to 99 percent hydrogen peroxide.

The method of the present invention is readily adapted to hybrid engines now in use and requires no special hardware. Many obvious modifications of this method will be apparent to those skilled in the art. Thus, no limitations should be attributed to the invention from the above detailed description except as reflected by the appended claims.

We claim:

1. In the method of operating a hybrid-propellant rocket engine wherein a fluid oxidizer is introduced into the combustion chamber of said engine to support the combustion of a solid fuel disposed in said chamber thereby generating thrust the improvement which comprises substituting water for said fluid oxidizer to support combustion of said fuel after initial ignition of said engine.

2. In the method of operating hybrid-propellant rocket engines wherein a fluid oxidizer is introduced into the combustion chamber of said engine to support the combustion of a solid fuel disposed in said chamber thereby generating thrust, the improvement which comprises first introducing into said chamber as a first oxidizer a member selected from the group consisting of hydrogen peroxide and water-hydrogen peroxide mixtures rich in hydrogen peroxide to support combustion upon ignition and thereafter introducing water to support continued combustion of said solid fuel while ceasing the introduction of said first oxidizer.

3. In the method of operating a hybrid-propellant rocket engine wherein a solid fuel is disposed in the combustion chamber of said engine and a fluid oxidizer is brought into contact with said grain, after initial ignition of said engine, with thrust being produced by the burning and combustion of said grain by said oxidizer, the improvement which comprises:

a. Substituting for said solid fuel grain a cured, intimate mixture of from about 10 percent by weight to about 95 percent by weight of at least one high-energy fuel additive selected from the group consisting of powdered aluminum and powdered aluminum hydride, said binder being selected from the group consisting of polymers of the conjugated dienes containing from four to six carbon atoms per molecule, copolymers of the conjugated dienes containing from four to six carbon atoms per molecule, copolymers of the conjugated dienes containing from four to six carbon atoms per molecule with each other, copolymers of the hydrocarbon conjugated dienes of from four to six carbon atoms per molecule with each other, copolymer of the conjugated dienes of from four to six carbon atoms per molecule with 2,3-bis(difluoroamino)propyl acrylate, polymers of the unsaturated carboxylic acids of up to eight carbon atoms, copolymers of the unsaturated carboxylic acids of up to eight carbon atoms with each other, polymers of the lower alkyl esters of the unsaturated carboxylic acids of up to eight carbon atoms, copolymer of the lower alkyl esters of the unsaturated carboxylic acids of up to eight carbon atoms with each other, copolymers of the unsaturated carboxylic acids of up to eight carbon atoms with 2,3bis(difluoroamono)propyl acrylate, copolymers of the lower alkyl esters of unsaturated carboxylic acids of up to eight carbon atoms with 2,3-bis(difluoroamino)propyl acrylate, copolymer of the unsaturated carboxylic acids of up to eight carbon atoms with the conjugated dienes of from four to six carbon atoms, and copolymer of the lower alkyl esters of the unsaturated aliphatic carboxylic acids of up to eight carbon atoms with the conjugated dienes of from four to six carbon atoms; and b. Substituting water for said fluid oxidizer.

4. The improvement according to claim 3 wherein said binder is a copolymer of acrylic acid and butadiene and said additive is aluminum hydride.

5. The improvement according to claim 3 wherein said oxidizer is brought into contact with said mixture in an amount ranging from about 0.8 times to about 1.2 times the stoichiometric amount.

6. The improvement according to claim 3 wherein said binder is poly-2,3-bis(difluoroamino)propylacrylate and said additive is aluminum.

7. The method of operating a hybrid-propellant rocket engine, said method comprising bringing together and burning in the combustion chamber of said engine, after initial ignition of said engine, a solid fuel grain and water, said fuel grain consisting essentially of a cured, intimate mixture of about 20 percent by weight to about 80 percent by weight of polybutadiene-acrylic acid copolymer and from about 20 percent by weight to about 80 percent by weight powdered aluminum.

8. The method according to claim 7 wherein said solid fuel grain consists essentially of about 20 percent by weight polybutadiene-acrylic acid copolymer and about 80 percent by weight powdered aluminum.

9. The method of operating a hybrid-fueled rocket engine, said method comprising bringing together and burning in the combustion chamber of said engine, after initial ignition of said engine, a solid fuel grain and water, said fuel grain consisting essentially of a cured, intimate mixture of about 20 percent by weight to about 80 percent by weight polybutadiene-acrylic acid copolymer and from about 20 percent by weight to about 80 percent by weight powdered aluminum hydride.

10. The method according to claim 9 wherein said fuel grain consists essentially of about 20 percent by weight polybutadiene-acrylic acid copolymer and about 80 percent by weight aluminum hydride.

* * * * *